UNITED STATES PATENT OFFICE.

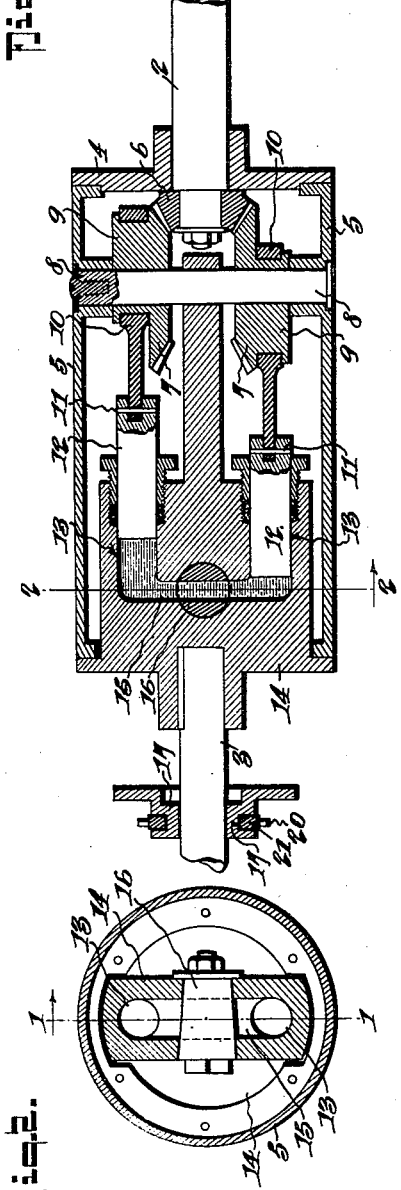

GEORGE CASSADY, OF NEW WESTMINSTER, BRITISH COLUMBIA, CANADA.

SPEED-CHANGE MECHANISM.

1,409,523. Specification of Letters Patent. Patented Mar. 14, 1922.

Application filed February 12, 1920. Serial No. 358,258.

*To all whom it may concern:*

Be it known that I, GEORGE CASSADY, a citizen of the Dominion of Canada, residing at New Westminster, in the Province of British Columbia, Canada, have invented certain new and useful Improvements in Speed-Change Mechanisms, of which the following is a specification.

This invention relates to a speed change mechanism between two shafts in the same axial alignment, such as in the driving gear of an automobile. It belongs to that class wherein the medium through which the speed of rotation is changed is a non-compressible liquid, the passage of which is controlled through a variable aperture.

The invention is particularly described in the following specification, reference being made to the drawings by which it is accompanied, in which:

Fig. 1 is a vertical longitudinal section through the axis of the shaft, being on the line 1—1 in Fig. 2, and Fig. 2 is a cross section on the line 2—2 in Fig. 1.

Fig. 3 is a side elevation, a portion of the casing being removed to show the mechanism within, and Fig. 4 is a plan showing the means for controlling the speed change valve.

In these drawings 2 represents the driving shaft from the engine and 3 the tail shaft connected by suitable mechanism to the driving wheels. The end of the shaft 2 is free to turn in the centre of a flange 4 to which is secured a casing 5. On the end of the shaft 2 which projects within the casing is secured a pinion 6, the teeth of which mesh with those of wheels 7 freely rotatable on a pin 8 extending diametrically across and secured in the casing 5.

Integral with or secured on each gear wheel 7 is an eccentric 9, the eccentricity of each of which is opposite the other. On each eccentric is mounted a strap 10 which is pin-connected at 11 to a plunger 12 endwise movable gland-packed in a chamber 13 bored in diametrically opposite sides of a member 14 secured to the opposite end of the casing 5, which end member is axially produced to form a mid-support for the pin 8.

The inner ends of the plunger chambers 13 are connected together by a duct 15, and intermediate of the chambers a plug valve 16 is rotatably mounted, having a port which registers with the duct 15, when in one position, but which may be turned across that duct to close passage between the chambers, and naturally may be moved to any intermediate position between fully opened and fully closed.

The plug valve 16 is partially rotated to control the passage between the two chambers 13, by the following means.

The tail shaft 3 is, as stated, secured in the end member 14 of the casing 5 in axial alignment with the shaft 2 rotatably mounted in the other end 4 of the casing. On this shaft 3 is slidably mounted a sleeve 17. This sleeve is endwise moved on the shaft by a lever 18 pivoted at 19 to the frame of the machine and looped to pass on each side of the sleeve 17 where it engages pins 20 projecting from a ring 21 rotatably mounted in the groove of the sleeve. The other end of the lever 18 is connected in any suitable manner so that it may be operated from the seat of the driver.

The sleeve may thus be moved endwise on the shaft while the shaft is rotating. From this sleeve 17 any suitable connection may be made to impart the required partial rotation to the plug valve 16. Such connection is here shown as made by a stem 28 endwise movable in the end 14 of the casing, the outwardly projecting end of which stem is connected to a flange on the sleeve 17. This stem 28 is link-connected at 22 to a lever 23 pivoted at 24 to the end 14 of the casing, the outer end of which lever is connected by a link 26 to an arm 27 secured on the key of the plug valve 16.

The position of the plug valve 16 may thus be varied while the shaft 3 is rotating, to open or close the valve or to place it in any desired intermediate position.

Obviously, if the port 15 of the valve 16 connects the two chambers 13, so that the liquid compressed by one of the plungers 12 may freely pass to fill the vacancy formed by the movement of the other plunger in the opposite direction, as there will be practically no resistance to free movement of the eccentrics 9 and their gear wheels 7, those wheels will rotate within the casing 5 without imparting rotation to the casing itself and therefore without rotating the tail shaft 3 which is secured to it; but if the valve 16 is closed the plungers 12 will meet a practically incompressible resistance in the liquid locked between the end of each plunger and the valve 16, and the pinion 6 being unable to rotate the gear wheel 7 must rotate the casing 5 and with it the shaft 3.

If the valve 16 is partially open so as to oppose a certain amount of resistance to the passage of the liquid between the chambers 13, the casing 5 and shaft 3 will rotate at a certain speed, dependent on the amount of resistance so offered.

The device forms a simple and effective means of varying the speed of rotation of the driven shaft 3 from the driving shaft 2 and one free from shock and noise. It is relatively cheap to construct, occupies little space and is not liable to derangement in use.

It is operable by rotation in either direction and where, as in an automobile rotation in either direction is necessary, any suitable means may be provided for effecting a reversing drive of the shaft 2.

Having now particularly described my invention, I hereby declare that what I claim as new and desire to be protected in by Letters Patent, is:

1. In a means for varying the speed of rotation of two shafts in the same axial alignment, wherein is provided fluid resisted pistons and a valve for controlling the fluid resistance between said pistons, said valve having a shaft, transmission gears and cam and pitman connections between said pistons and said gears and a driven shaft; a sliding sleeve on one of said shafts, a stem carried by said sleeve, means for guiding said stem past the location of said valve, a valve operating crank on the shaft of said valve, a pivoted lever, a link connection between said valve operating crank and said pivoted lever, and a link connection between said pivoted lever and said stem, and a lever device cooperative with said sleeve for sliding the same along said shaft to thereby effect control of said valve.

2. In apparatus of the class described, wherein is provided a driving and a driven shaft with transmission gear connections between the same, including pinion gears and fluid resisted pistons cooperative with the gears; a casing including a unitary plug provided with piston bores and a communicating duct between said piston bores, a rotary control valve in said duct, means for securing said plug rigidly to the driven shaft, a sliding sleeve on the driven shaft, a stem on the sleeve projecting through a bearing aperture provided in said plug, and valve controlling connections between said stem and said valve, all mounted on said plug as a unit, substantially as shown and described.

In testimony whereof I affix my signature.

GEORGE CASSADY.